United States Patent
Danielsen et al.

(10) Patent No.: US 12,359,297 B2
(45) Date of Patent: Jul. 15, 2025

(54) CASE FLOWPATH REPAIR SYSTEM AND METHOD

(71) Applicant: Raytheon Technologies Corporation, Farmington, CT (US)

(72) Inventors: Heather Danielsen, Bremerton, WA (US); Norman J. Gagnon, Rochester, NH (US); Keith C. Pooler, Lebanon, ME (US); Jason L. Christiansen, Madbury, NH (US); Michael G. Fischer, Somersworth, NH (US)

(73) Assignee: RTX CORPORATION, Farmington, CT (US)

( * ) Notice: Subject to any disclaimer, the term of this patent is extended or adjusted under 35 U.S.C. 154(b) by 529 days.

(21) Appl. No.: 17/238,937

(22) Filed: Apr. 23, 2021

(65) Prior Publication Data
US 2022/0341019 A1  Oct. 27, 2022

(51) Int. Cl.
| C23C 4/134 | (2016.01) |
| B33Y 10/00 | (2015.01) |
| C23C 4/08 | (2016.01) |
| F01D 25/24 | (2006.01) |

(52) U.S. Cl.
CPC .............. *C23C 4/134* (2016.01); *B33Y 10/00* (2014.12); *C23C 4/08* (2013.01); *F01D 25/24* (2013.01); *F05D 2230/312* (2013.01); *F05D 2230/80* (2013.01); *F05D 2230/90* (2013.01); *F05D 2240/12* (2013.01); *F05D 2300/173* (2013.01)

(58) Field of Classification Search
CPC ........... C23C 4/134; C23C 4/08; B33Y 10/00; F01D 25/24; F05D 2230/312; F05D 2230/80; F05D 2230/90; F05D 2240/12; F05D 2300/173; B05D 3/08; B05D 3/002; B05D 3/12; B05D 3/007
See application file for complete search history.

(56) References Cited

U.S. PATENT DOCUMENTS

| 5,956,845 A | 9/1999 | Arnold |
| 6,887,529 B2 | 5/2005 | Borneman |
| 2005/0235493 A1* | 10/2005 | Philip ..................... F01D 5/288 29/889.1 |
| 2006/0165517 A1 | 7/2006 | Foucher |
| 2007/0202269 A1* | 8/2007 | Potter .................. C23C 28/3215 427/446 |
| 2011/0110783 A1 | 5/2011 | Addis |
| 2012/0160664 A1 | 6/2012 | Ivory |
| 2016/0010488 A1* | 1/2016 | Albers ................ C23C 14/0664 415/148 |
| 2017/0369981 A1* | 12/2017 | Srinivasan .............. F01D 5/288 |
| 2022/0281025 A1 | 9/2022 | Danielsen |

OTHER PUBLICATIONS

EP search report for EP22169852.5 filed Sep. 28, 2022.

* cited by examiner

*Primary Examiner* — Dah-Wei D. Yuan
*Assistant Examiner* — Nga Leung V Law
(74) *Attorney, Agent, or Firm* — Getz Balich LLC

(57) ABSTRACT

A method for repairing a flow path surface of a case for a variable vane assembly includes measuring a wear depth at a location within a wear recess formed in the flow path surface of the case, determining a coating thickness corresponding to the wear depth at the location, and repairing the flow path surface of the case by applying a coating to the wear recess, where the coating has the coating thickness at the location.

10 Claims, 8 Drawing Sheets

CASE FLOWPATH REPAIR SYSTEM AND METHOD

BACKGROUND

1. Technical Field

This disclosure relates generally to gas turbine engines, and more particularly to repair systems and methods for case wear caused by variable stator vanes of gas turbine engines.

2. Background Information

Gas turbine engines may typically include a compressor section to pressurize inflowing air, a combustor section to burn a fuel in the presence of the pressured air, and a turbine section to extract energy from the resulting combustion gases. Gas turbine engines may include one or more stages of variable stator vanes configured to optimize compressor operability and/or efficiency over the compressor speed range. Variable stator vanes may include vanes which are not fixed but which pivot about an axis so as to vary the angle of the vane airfoil relative to the inflowing air. In some cases, rotation of the variable stator vanes may result in wear to the flow path surface of the case within which the variable stator vanes are mounted. Accordingly, there is a need for systems and methods which address the formation of wear in case flow path surfaces.

SUMMARY

It should be understood that any or all of the features or embodiments described herein can be used or combined in any combination with each and every other feature or embodiment described herein unless expressly noted otherwise.

According to an aspect of the present disclosure, a method for repairing a flow path surface of a case for a variable vane assembly includes measuring a wear depth at a location within a wear recess formed in the flow path surface of the case, determining a coating thickness corresponding to the wear depth at the location, and repairing the flow path surface of the case by applying a coating to the wear recess, where the coating has the coating thickness at the location.

In any of the aspects or embodiments described above and herein, the case includes a plurality of stator pockets formed in the flow path surface.

In any of the aspects or embodiments described above and herein, the wear recess extends about a circumferential portion of a first stator pocket of the plurality of stator pockets between a first circumferential side and a second circumferential side.

In any of the aspects or embodiments described above and herein, the flow path surface defines at least one lip of the wear recess along at least the first circumferential side.

In any of the aspects or embodiments described above and herein, the method further includes machining the flow path surface to remove the at least one lip prior to applying the coating to the wear recess.

In any of the aspects or embodiments described above and herein, applying the coating to the wear recess including depositing the coating in the wear recess using a double-wire feed and plasma arc additive manufacturing process.

In any of the aspects or embodiments described above and herein, applying the coating to the wear recess includes applying a plurality of coating layers.

In any of the aspects or embodiments described above and herein, the coating is a nickel-aluminum plasma coating.

In any of the aspects or embodiments described above and herein, measuring the wear depth includes measuring a plurality of wear depths at a plurality of respective locations within the wear recess, determining the coating thicknesses includes determining a plurality of coating thicknesses corresponding to the plurality of wear depths at the plurality of respective locations, and the coating has the plurality of coating thicknesses at the plurality of respective locations.

According to another aspect of the present disclosure, a method for repairing a flow path surface of a case for a variable vane assembly includes machining the flow path surface of the case to remove a lip of a wear recess formed in the flow path surface, repairing the flow path surface of the case by applying a coating to the wear recess with a coating spray torch. The coating has a thickness which is equal to or greater than a wear depth of the wear recess. The method further includes machining the coating in the wear recess to restore the flow path surface to a predetermined dimensional specification.

In any of the aspects or embodiments described above and herein, the case includes a plurality of stator pockets formed in the flow path surface.

In any of the aspects or embodiments described above and herein, the wear recess is located proximate a first stator pocket of the plurality of stator pockets and is formed in the flow path surface outside of the first stator pocket. The wear recess extends between a first side and a second side.

In any of the aspects or embodiments described above and herein, the flow path surface defines a lip of the wear recess along the first side of the wear recess.

In any of the aspects or embodiments described above and herein, applying the coating to the wear recess includes applying a plurality of coating layers.

In any of the aspects or embodiments described above and herein, the method further includes rotating the case to align the coating spray torch with the wear recess prior to applying the coating to the wear recess.

According to another aspect of the present disclosure, a repair system for repairing a flow path surface of a case for a variable vane assembly includes a gauge, a coating spray torch, and a control system in signal communication with the gauge and the coating spray torch. The control system includes memory containing instructions recorded therein which, when executed by the control system, cause the control system to measure a wear depth, with the gauge, at a location within a wear recess formed in the flow path surface of the case, determine a coating thickness corresponding to the wear depth at the location, and apply a coating to the wear recess with the coating spray torch. The coating has the coating thickness at the location.

In any of the aspects or embodiments described above and herein, the repair system further includes a milling machine in signal communication with the control system. The memory further contains instructions recorded therein which, when executed by the control system, cause the control system to machine the flow path surface of the case, with the milling machine, to remove a lip of the wear recess formed in the flow path surface.

In any of the aspects or embodiments described above and herein, the repair system further includes a rotatable fixture configured to hold the case. The memory further contains instructions recorded therein which, when executed by the control system, cause the control system to rotate the case, with the rotatable fixture, to align the coating spray torch with the wear recess.

In any of the aspects or embodiments described above and herein, applying the coating to the wear recess includes depositing the coating in the wear recess using a double-wire feed and plasma arc additive manufacturing process.

In any of the aspects or embodiments described above and herein, applying the coating to the wear recess includes applying a plurality of coating layers.

In any of the aspects or embodiments described above and herein, the coating is a nickel-aluminum plasma coating.

The present disclosure, and all its aspects, embodiments and advantages associated therewith will become more readily apparent in view of the detailed description provided below, including the accompanying drawings.

DETAILED DESCRIPTION

Figure 1:
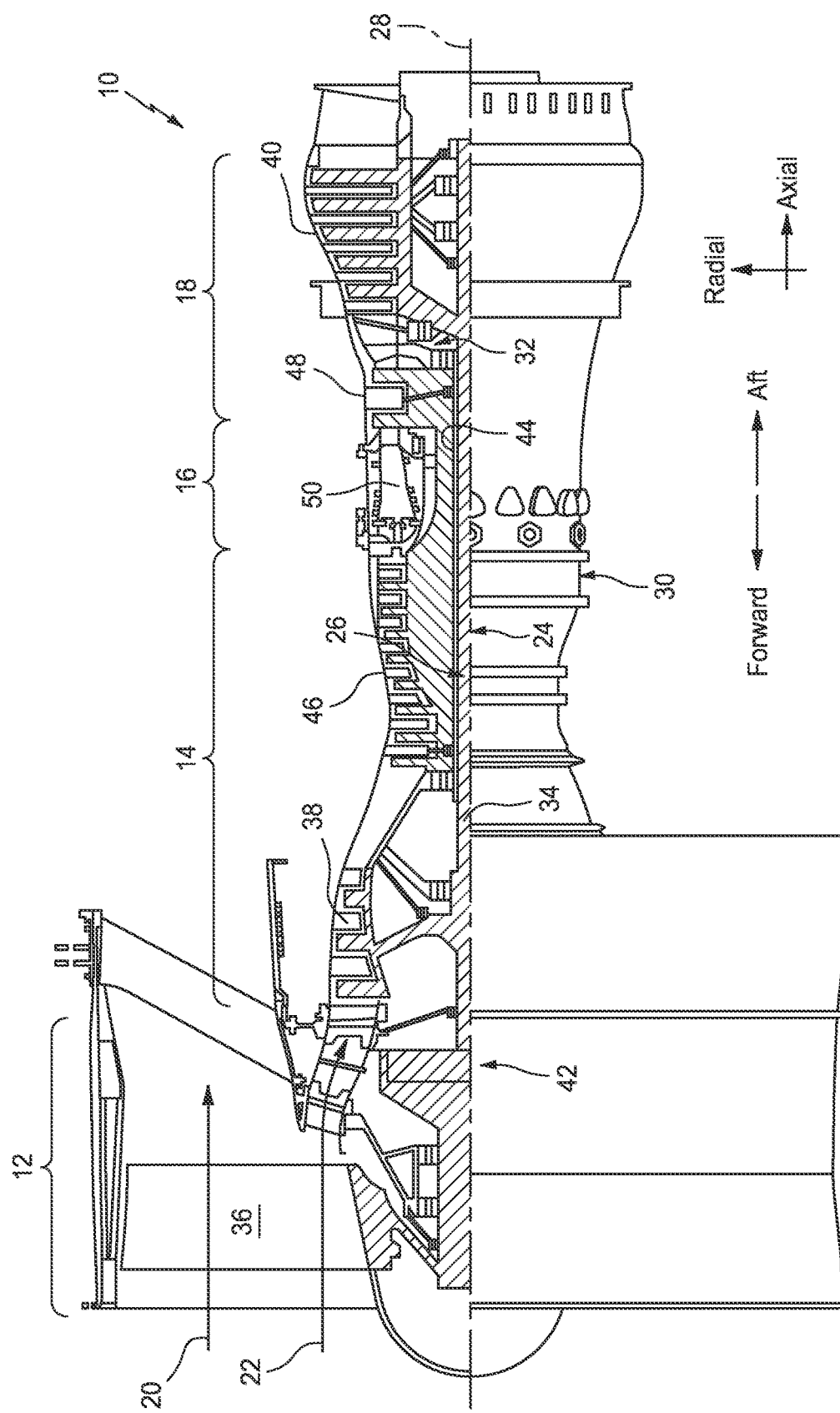
FIG. 1 illustrates a side cross-sectional view of a gas turbine engine, in accordance with one or more embodiments of the present disclosure.

Referring to FIG. 1, an exemplary gas turbine engine 10 is schematically illustrated. The gas turbine engine 10 is disclosed herein as a two-spool turbofan engine that generally includes a fan section 12, a compressor section 14, a combustor section 16, and a turbine section 18. The fan section 12 drives air along a bypass flow path 20 while the compressor section 14 drives air along a core flow path 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans or even with gas turbine engines and may be applicable to any rotational machinery having variable stator vanes, as will be discussed below in further detail.

The gas turbine engine 10 generally includes a low-pressure spool 24 and a high-pressure spool 26 mounted for rotation about a longitudinal centerline 28 of the gas turbine engine 10 relative to an engine static structure 30 via one or more bearing systems 32. It should be understood that various bearing systems 32 at various locations may alternatively or additionally be provided.

The low-pressure spool 24 generally includes a first shaft 34 that interconnects a fan 36, a low-pressure compressor 38, and a low-pressure turbine 40. The first shaft 34 is connected to the fan 36 through a gear assembly of a fan drive gear system 42 to drive the fan 36 at a lower speed than the low-pressure spool 24. The high-pressure spool 26 generally includes a second shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the longitudinal centerline 28. The first shaft 34 and the second shaft 44 are concentric and rotate via the one or more bearing systems 32 about the longitudinal centerline 28 which is collinear with respective longitudinal centerlines of the first and second shafts 34, 44.

Airflow along the core flow path 22 is compressed by the low-pressure compressor 38, then the high-pressure compressor 46, mixed and burned with fuel in the combustor 50, and then expanded over the high-pressure turbine 48 and the low-pressure turbine 40. The low-pressure turbine 40 and the high-pressure turbine 48 rotationally drive the low-pressure spool 24 and the high-pressure spool 26, respectively, in response to the expansion.

Figure 2:
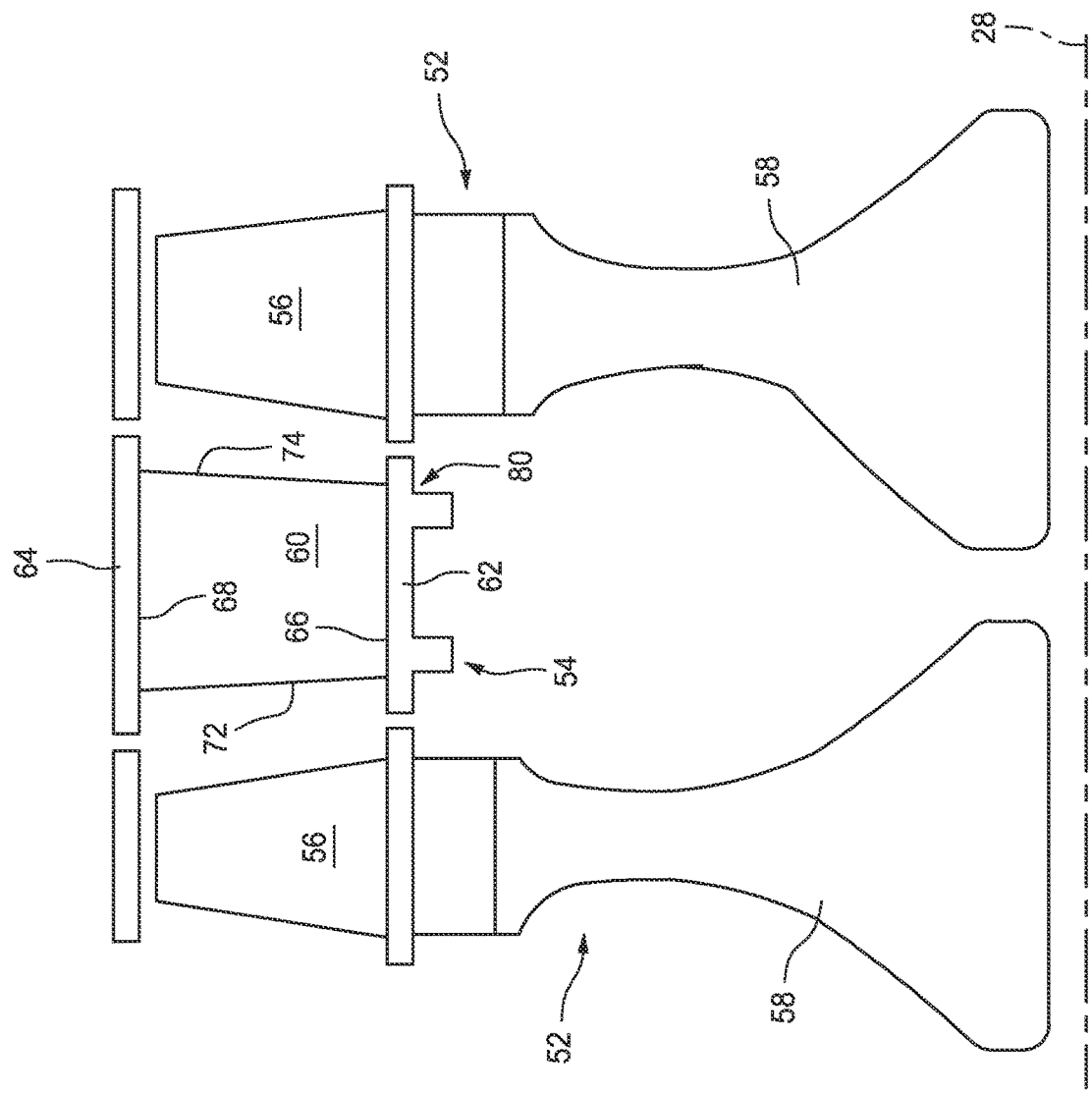
FIG. 2 illustrates a side cross-sectional view of a portion of a gas turbine engine including a variable vane assembly, in accordance with one or more embodiments of the present disclosure.

Referring to FIG. 2, a portion of the gas turbine engine 10 is illustrated including axially interspersed stages of rotor assemblies 52 and stator assemblies 54. As shown in FIG. 2, the portion of the gas turbine engine 10 may be associated with the compressor section 14 of the gas turbine engine 10, however, the present disclosure is not limited to compressors, such as the low-pressure compressor 38 or the high-pressure compressor 46 of the compressor section 14. Each rotor assembly 52 generally includes a plurality of blades 56 coupled to and circumferentially spaced about a disk 58 disposed radially inward of the core flow path 22, with respect to the longitudinal centerline 28. The blades 56 project radially outward from the disk 58 into the core flow path 22. In operation, the disk 58 and respective blades 56 of each rotor assembly 52 are configured to rotate about the longitudinal centerline 28. Each stator assembly 54 generally includes a plurality of vanes 60 located within the core flow path 22 and configured to direct core gases toward downstream blades 56. The vanes 60 are circumferentially fixed relative to the axial centerline 28 (e.g., the vanes 60 do not rotate about the axial centerline 28). The vanes 60 are coupled to and extend radially between an annular inner diameter (ID) case 62 and an annular outer diameter (OD) case 64 radially outward of the ID case 62. Each vane 60 is coupled to the ID case 62 at a radially inner end 66 of the vane 60 and to the OD case 64 at a radially outer end 68 of the vane 60. The vanes 60 are circumferentially spaced about the longitudinal centerline 28 between the ID case 62 and the OD case 64. Each of the blades 56 and the vanes 60 may generally be referred to as an airfoil.

Each vane 60 includes an airfoil body 70 including a leading edge 72 and a trailing edge 74 with respect to a direction of flow of core gases along the core flow path 22. The airfoil body 70 further includes a pressure side (e.g., having a generally concave surface) and a suction side (e.g., having a generally convex surface). Each of the pressure side and the suction side extend between and are joined together at the leading edge 72 and the trailing edge 74. As shown in FIG. 2, at least one stator assembly 54 may be a variable vane assembly 80 in which each of the respective vanes 60 is a variable vane. A "variable vane" as defined herein, refers to a vane 60 configured to rotate about a vane axis defined through the airfoil body 70 of the vane 60, for example, generally in a direction between the ID case 62 and the OD case 64. As such, the vane 102 may be configured to vary an angle of attack of the airfoil body 70 relative to the flow direction of core gases along the core flow path 22. While aspects of the present disclosure are discussed with respect to a variable vane assembly 80 for the gas turbine engine 10, it should be understood that the aspects of the present disclosure may be applicable to any variable vane assembly (e.g., an assembly with a variable vane 60).

Figure 3:
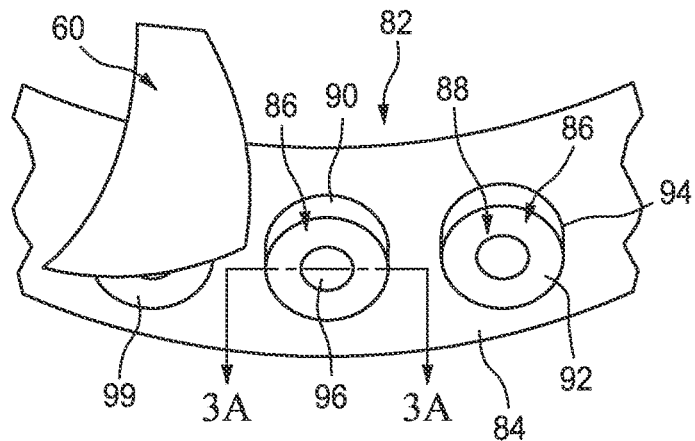
FIG. 3 illustrates a perspective view of a portion of a case illustrated in FIG. 2, in accordance with one or more embodiments of the present disclosure.
Figure 3A:
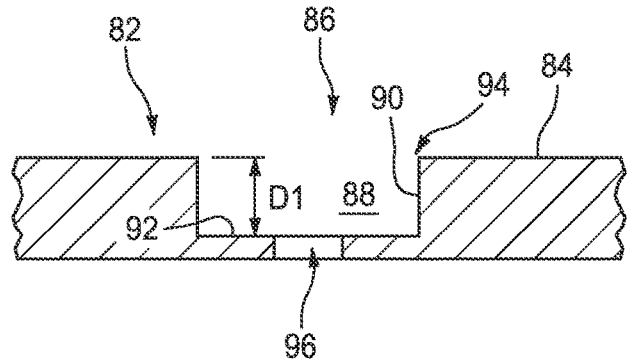
FIG. 3A illustrates a side cross-sectional view of a portion of the case illustrated in FIG. 3 taken along line 3A-3A, in accordance with one or more embodiments of the present disclosure.

Referring to FIGS. 3 and 3A, a circumferential portion of a variable vane assembly 80 is illustrated in FIG. 3 with an exemplary variable vane 60. The variable vane assembly 80 includes a variable vane assembly case 82 having a flow path surface 84 which defines a portion of the core flow path 22 through the gas turbine engine 10. In various embodiments, the case 82 may be an ID case (e.g., the ID case 62) and, accordingly, the flow path surface 84 may be a radially outer surface of the case 82 with respect to the longitudinal centerline 28. In various other embodiments, the case 82 may be an OD case (e.g., the OD case 64) and, accordingly, the flow path surface 84 may be a radially inner surface of the case 82 with respect to the longitudinal centerline 28. Further, in various embodiments, the case 82 may be representative of both an ID case and an OD case for the variable vane assembly 80.

The case 82 includes a plurality of stator pockets 86 formed through the flow path surface 84 and circumferentially spaced about the case 82. In various embodiments, each stator pocket 86 defines a pocket recess 88 and includes a pocket sidewall 90 extending a depth D1 from the flow path surface 84 to a bottom surface 92 of the stator pocket 86. The flow path surface 84 defines an opening edge 94 of the stator pocket 86 where the flow path surface 84 intersects the pocket sidewall 90. The case 82 further includes a pocket aperture 96 formed through the bottom surface 92 of the stator pocket 86. In various embodiments, the pocket recess 88 and the pocket aperture 96 may define a counterbore. The stator pocket 86 is configured to interface with a mating portion 99 of a respective variable vane 60. The pocket aperture 96 is configured to allow passage of a shaft (not shown) through the case 82 for operation (e.g., rotation by an actuation system) or rotational support of the variable vane 60.

Figure 4:
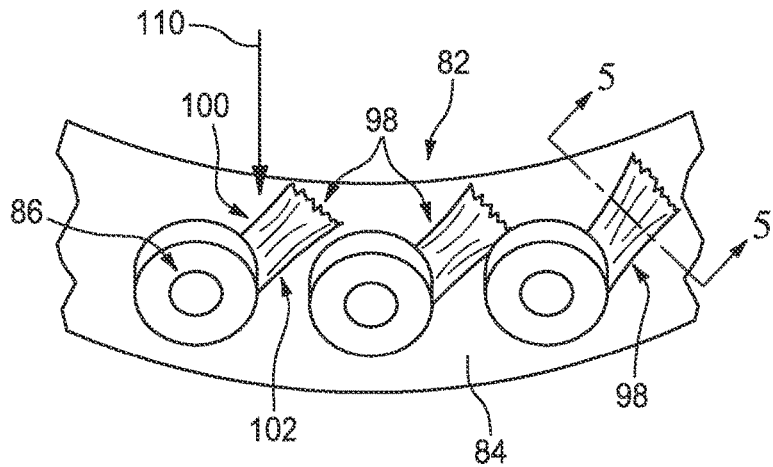
FIG. 4 illustrates a perspective view of the portion of the case illustrated in FIG. 3 including a plurality of wear recesses, in accordance with one or more embodiments of the present disclosure.
Figure 5A:
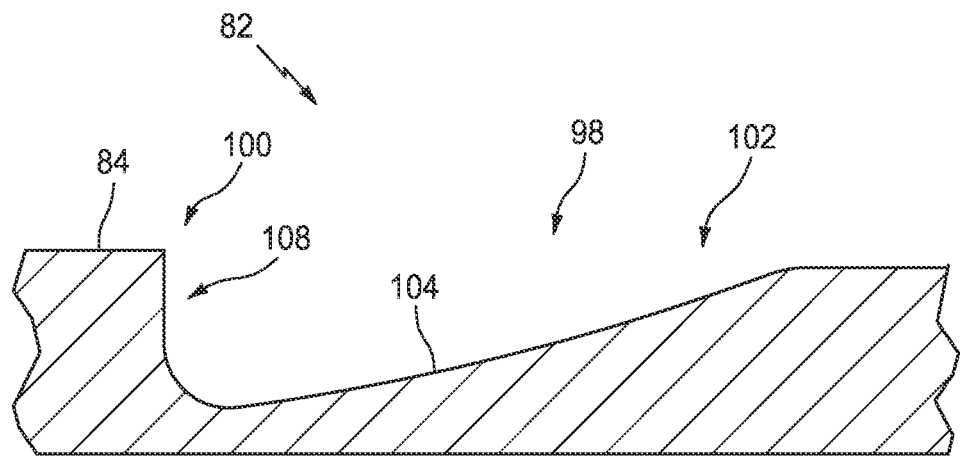
FIG. 5A illustrates a side cross-sectional view of an exemplary wear recess of the case illustrated in FIG. 4 taken along line 5-5, in accordance with one or more embodiments of the present disclosure.
Figure 5B:
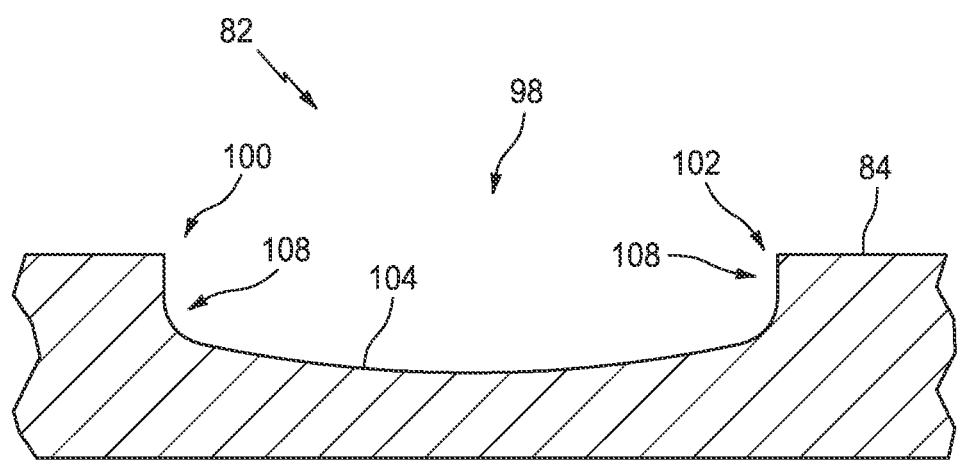
FIG. 5B illustrates a side cross-sectional view of another exemplary wear recess of the case illustrated in FIG. 4 taken along line 5-5, in accordance with one or more embodiments of the present disclosure.
Figure 6:
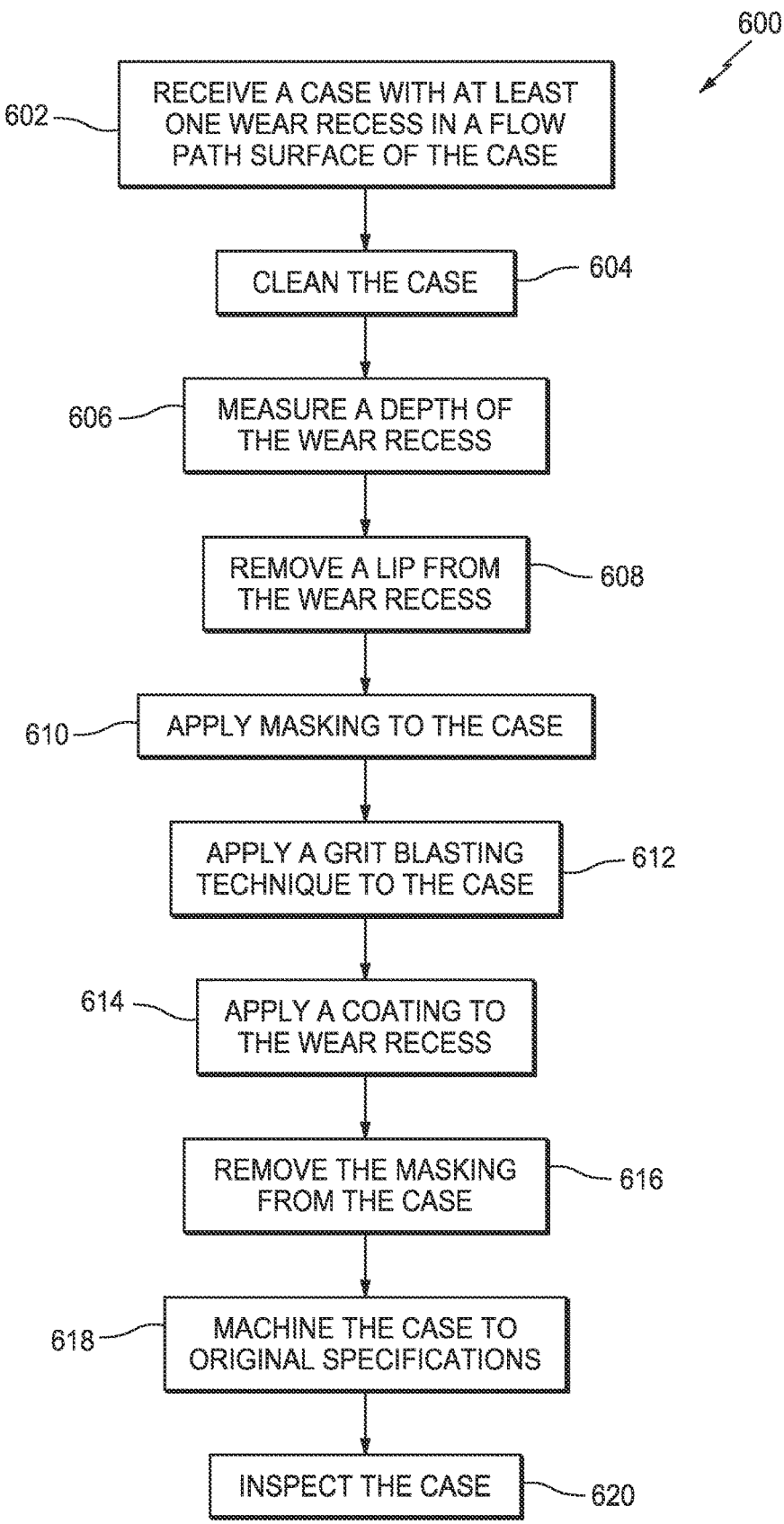
FIG. 6 illustrates a flowchart depicting a method for repairing a flow path surface of a case for a variable stator assembly, in accordance with one or more embodiments of the present disclosure.

Referring to FIGS. 4-6, repeated operation (e.g., rotation) of the variable vane 60 may result in wear to the flow path surface 84 of the case 82 over numerous cycles of the gas turbine engine 10. FIG. 4 illustrates the case 82 having a plurality of wear recesses 98 formed in the flow path surface 84 as a result of variable vane 60 operation, with the variable vane 60 shown in FIG. 3 removed for clarity. Wear on the flow path surface 84 may be caused by "vane lean" which results in contact between the variable vane 60 and surrounding portions of the flow path surface 84. The wear to the flow path surface 84 from the variable vanes 60 may be asymmetrical in nature and, accordingly, may result in unique wear recesses 98 which vary in shape, size, location, and/or wear depth.

In various embodiments, the wear recess 98 may extend generally circumferentially about a circumferential portion of a stator pocket 86, with respect to a centerline axis of a respective stator pocket 86, between a first circumferential side 100 and a second circumferential side 102. In various embodiments and as shown, for example, in FIG. 5A, the wear may frequently result in a wear recess 98 having a sharp "ledge" or "lip" 108 on the first circumferential side 100 of the wear recess 98, and the wear recess 98 may sweep out to substantially zero wear on the second, opposite circumferential side 102 of the wear recess 98. In various embodiments and as shown, for example, in FIG. 5B, the wear may also result in a wear recess 98 having a lip 108 along both of the circumferential sides 100, 102. In various other embodiments, a wear recess 98 may not include a lip 108. However, it should be understood that the aspects of the present disclosure are not limited to any particular form of the wear recess 98 in the flow path surface 84 and, as noted above, the wear recesses 98 may vary in shape, size, location, and/or wear depth.

Formation of the wear recesses 98 on the flow path surface 84 may reduce the life and efficiency of the variable vane assembly 80 and associated equipment of the gas turbine engine 10, such as the compressors 38, 46. As the wear recesses 98 develop over numerous cycles of the gas turbine engine 10, the wear recesses 98 may increasingly result in increased drag and efficiency loss. Efficiency may be lost as a result of core gases passing through the wear recesses 98 instead of passing directly along the flow path surface 84 of the case 82. Formation of the wear recesses 98 may also result in misalignment of the variable vanes 60 by allowing the variable vanes 60 to tilt further in the direction of the respective wear recesses 98. For example, the increased tilt or "tip" of the variable vanes 60 may cause the variable vanes 60 to direct core gases toward downstream blades 56 at a nonoptimal angle, thereby causing further aerodynamic loss of efficiency. Additionally, as the variable vanes 60 lean and wear into the case 82, the associated rubbing interaction between the variable vanes 60 and the case 82 presents additional resistance and load on the actuation system (now shown) for the variable vane assembly 80 due to the increase in friction from the rubbing interaction.

Accordingly, the flow path surface 84 of the case 82 may be repaired by a method and/or system disclosed herein in order to restore the design dimensions of the flow path surface 84. Repairs for the case 82 may be initiated based on observation of flow path surface 84 wear or indirect observations of wear such as, for example, loss of equipment efficiency. Repairs may also be initiated at predetermined periodicities or after a predetermined number of engine cycles or operational hours. The present disclosure is not limited to any particular criteria for initiating repair of the case 82 flow path surface 84.

Referring to FIGS. 4 and 6-10, aspects of the present disclosure include a method 600 for repairing the flow path surface 84 of the case 82 for a variable vane assembly 80. The method 600 includes receiving a case 82 having at least one wear recess 98 formed in the flow path surface 84 of the case 82 as shown, for example, in FIG. 4 (Step 602). In various embodiments, the method 600 may include cleaning the case 82 (Step 604). For example, a suitable cleaning technique may be applied to at least the flow path surface 84 of the case 82.

Figure 7:
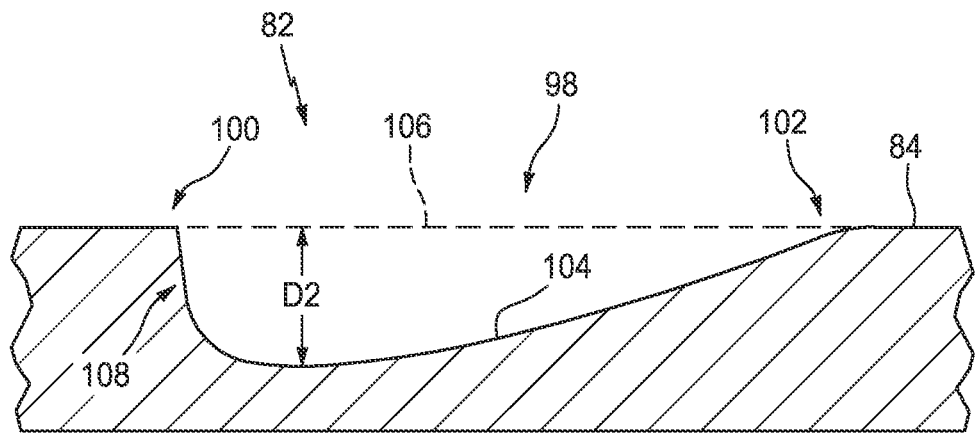
FIG. 7 illustrates a side cross-sectional view of the exemplary wear recess illustrated in FIG. 5A at a stage of repair, in accordance with one or more embodiments of the present disclosure.
Figure 8:
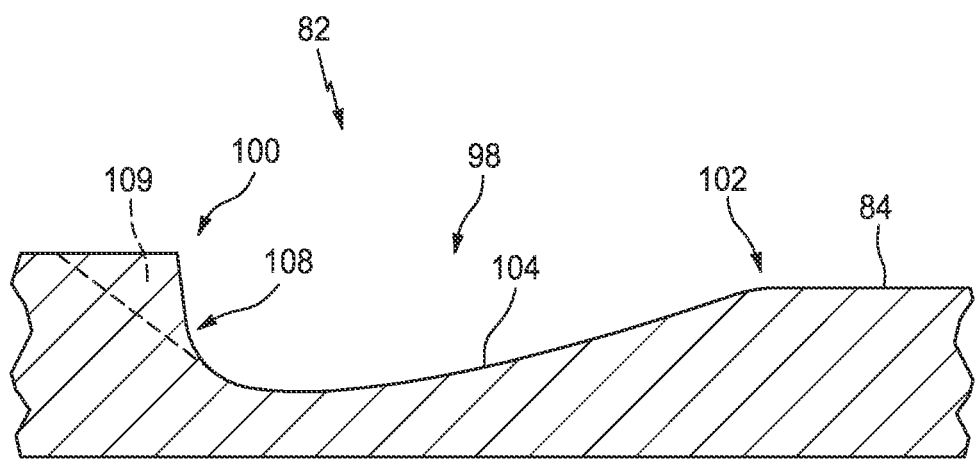
FIG. 8 illustrates a side cross-sectional view of the exemplary wear recess illustrated in FIG. 5A at a stage of repair, in accordance with one or more embodiments of the present disclosure.

The method 600 further includes measuring a wear depth D2 at a location within a wear recess 98 as shown, for example, in FIG. 7 (Step 606). For example, the wear depth D2 may be measured for each wear recess 98 formed in the flow path surface 84 of the case 82 by measuring from a wear surface 104 of a respective wear recess 98 to a position 106 corresponding to the original position of the flow path surface 84 (e.g., the design position of the flow path surface 84 for a case 82 which has not experienced wear). The wear depth D2 may be measured in a substantially radial direction relative to the longitudinal centerline 28. The wear depth D2 of the wear recesses 98 may be performed, for example, with a dimensional measurement gauge or other suitable measurement device. In various embodiments, measuring the wear depth D2 of a wear recess 98 may include measuring a plurality of wear depths D2 at a corresponding plurality of locations within the wear recess 98 to account for varying shapes, sizes, and wear depths for each particular wear recess 98. In various embodiments, the wear depths D2 of a plurality of wear recesses 98 may be measured sequentially in a predetermined order. For example, the wear depths D2 of the plurality of wear recesses 98 may be measured sequentially in a circumferential direction about the case 82. In various embodiments, measuring the wear depths D2 of the wear recesses 98 of the case 82 may include determining a maximum depth of each wear recesses 98 formed in the flow path surface 84 of the case 82. In various embodiments, where the maximum depth of one or more wear recesses 98 exceeds a predetermined wear depth threshold, it may be determined that the case 82 should not be repair and, instead, should be replaced.

In various embodiments, the method 600 may include machining the flow path surface 84 of the case 82 to remove a lip 108 of a respective wear recess 98 (Step 608). As will be discussed in further detail, during performance of the repair method 600, one or more tools used to effect the method 600 may approach a wear recess 98 in a direction approaching an axial side of the case 82, for example, substantially in a tool insertion direction 110 shown in FIG. 4. The presence of a lip 108 along the tool insertion direction 110 may cause a shadowing effect for a spray torch used to apply a coating to the respective wear recess 98, thereby presenting a risk of increased porosity and/or poor surface finish of the coating deposited within the respective wear recess 98. Accordingly, a portion 109 of the case 82 defining the lip 108 may be removed from the respective wear recess 98 to allow a tool, such as a spray torch, to fully access the respective wear recess 98 as shown, for example, in FIG. 8.

Figure 9:
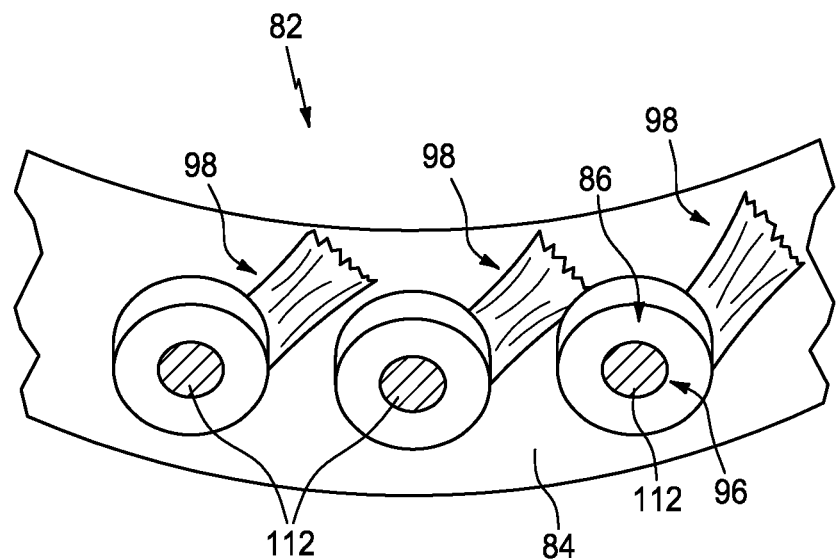
FIG. 9 illustrates a perspective view of the portion of the case illustrated in FIG. 4 at a stage of repair, in accordance with one or more embodiments of the present disclosure.
Figure 10:
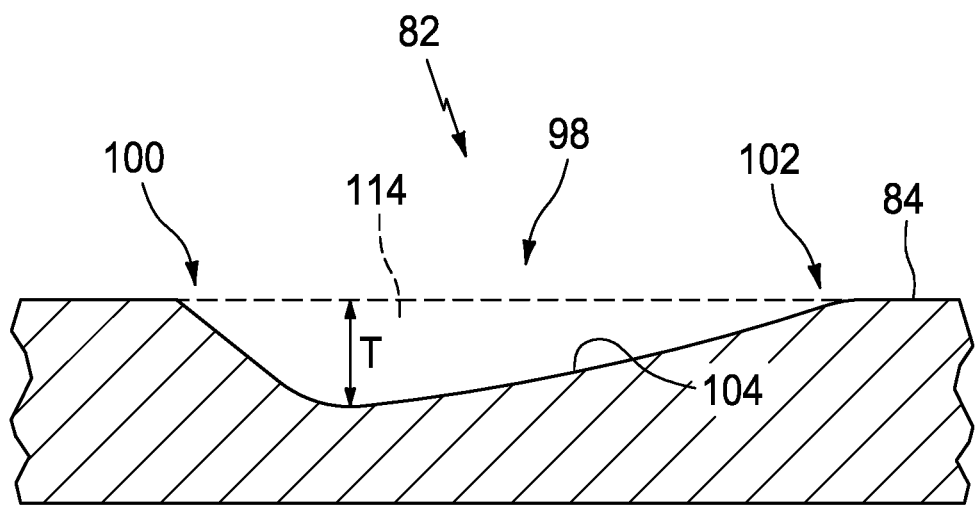
FIG. 10 illustrates a side cross-sectional view of the exemplary wear recess illustrated in FIG. 5A at a stage of repair, in accordance with one or more embodiments of the present disclosure.

In various embodiments, the method 600 may include applying masking 112 to a portion of the case 82 as shown, for example, in FIG. 9 (Step 610). The masking 112 may be applied, for example, to the pocket apertures 96 located in the respective stator pockets 86 of the case 82. Unmasked portions of the case 82 may include the flow path surface 84 and/or portions of one or more of the stator pockets 86. In various embodiments, wear caused by operation of the variable vanes 60 may also occur on surfaces inside the stator pockets 86 such as the pocket sidewall 90 or the bottom surface 92. Accordingly, one or more of the stator pockets 86 may be left unmasked so that wear formations within one or more of the stator pockets 86 may be repaired in addition to the flow path surface 84. In various embodiments, repairing the stator pockets 86 may be unnecessary or undesirable and Step 610 may additionally include applying the masking 112 to the stator pockets 86. In various embodiments, the masking 112 may include ultraviolet (UV) masking, hard masking, etc. and the present disclosure is not limited to any particular masking material.

In various embodiments, the method 600 may include applying a grit blasting technique to the case 82 (Step 612). The grit blasting technique may be applied to the unmasked portions of the case 82 (e.g., the wear surfaces 104 of the respective wear recesses 98) to provide a rough surface texture in preparation for application of a spray coating. In various embodiments, performance of the grit blasting technique may not be necessary, for example, as based on the selected spray coating process and/or the preexisting surface texture of the portions of the case 82 to which the spray coating may be applied.

The method 600 includes applying a coating 114 to a wear recesses 98 formed in the flow path surface 84 of the case 82 (Step 614). The applied coating 114 may have a thickness T at a location within a wear recess 98 which is substantially equal to or greater than the wear depth D2 measured at the location within the wear recess 98. In various embodiments, the applied coating 114 may have a plurality of thicknesses T at a plurality of locations within a wear recess 98 which are substantially equal to or greater than the plurality of wear depths D2 measured at the respective plurality of locations within the wear recess 98. In various embodiments, applying the coating 114 to a wear recess 98 may be performed by applying a series of coating layers in the wear recess 98. For example, applying the coating 114 may include apply a first coating layer sequentially to each wear recess 98 of the plurality of wear recesses 98, followed by applying a second coating layer sequentially to each wear recess 98 of the plurality of wear recesses 98, followed by applying subsequent coating layers sequentially to each wear recess 98 of the plurality of wear recesses 98, until the applied coating 114 in each wear recess 98 of the plurality of wear recesses 98 is substantially equal to or greater than the respective wear depths D2 measured at the respective locations within each of the wear recesses 98. In various embodiments the coating applied coating 114 may be made from a nickel-based alloy (e.g., a metal alloy having nickel as its primary constituent). For example, in various embodiments, the applied coating 114 may be made from a nickel-aluminum plasma, a molybdenum-nickel-aluminum plasma, or another suitable nickel-based alloy. Nickel-based alloy coating materials may be capable of achieving greater coating thicknesses than other alloys and may be beneficial for repairing wear recesses 98 having relatively large wear depths D2. However, the present disclosure is not limited to using nickel-based alloys for the applied coating 114 and other alloys may be used, for example, aluminum-graphite composite plasma or another suitable metal alloy material. In various embodiments, the coating Step 614 may be performed using a double-wire feed and plasma arc additive manufacturing process (DFW-PAM).

The method 600 may also include removing the masking 112 from the case (Step 616) and machining the flow path surface 84 of the case 82 to the design specification dimensions for the case 82. For example, Step 616 may include machining the applied coating 114 of the repaired wear recesses 98 to form a smooth surface that is flush with the surrounding portions of the flow path surface 84. Finally, the method 600 may include a visual and dimensional inspection of the case 82 to ensure that the case 82 is within predetermined tolerances of the design specification dimensions for the case 82 (Step 620).

Figure 11:
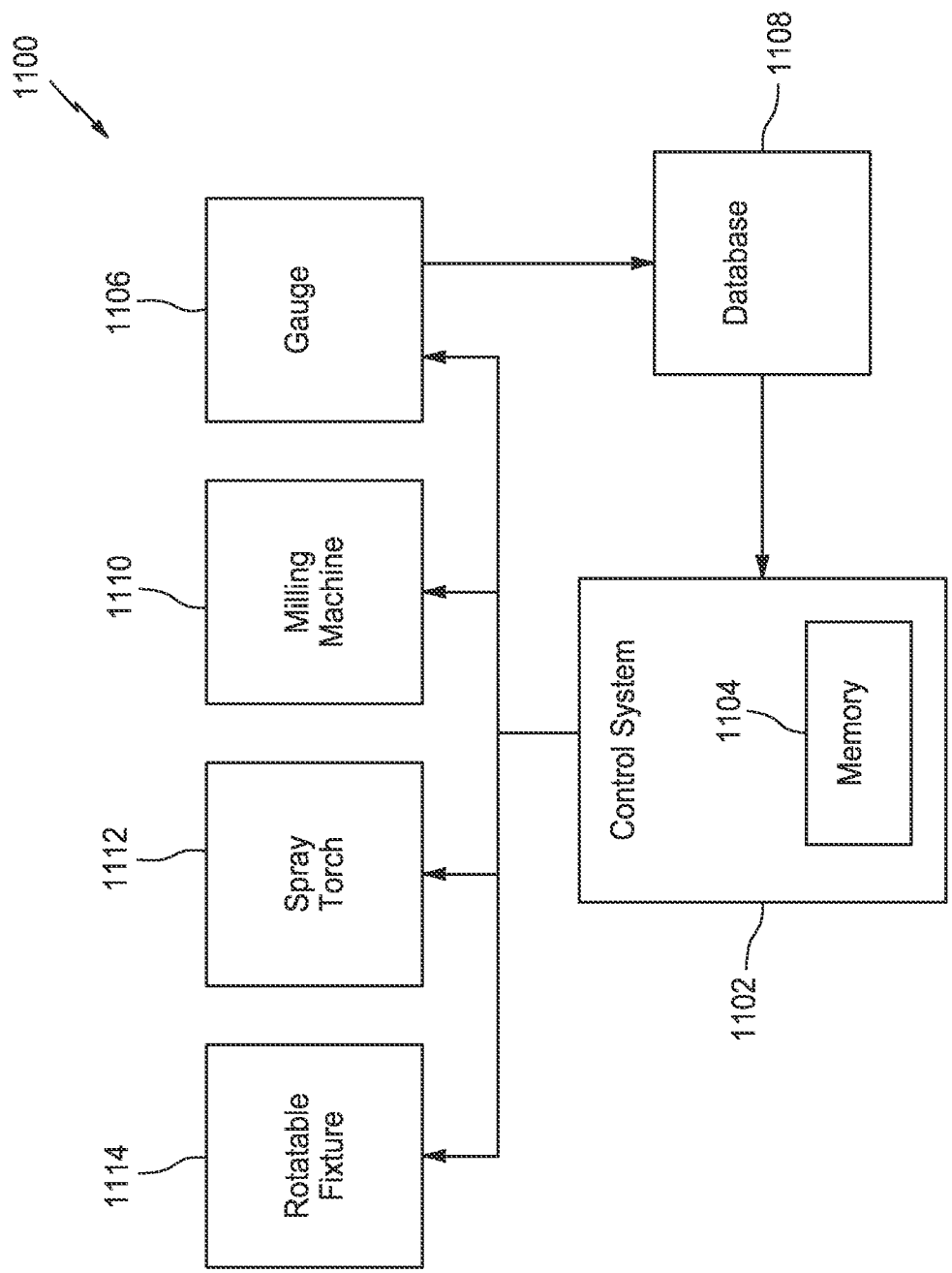
FIG. 11 illustrates a block diagram of a repair system, in accordance with one or more embodiments of the present disclosure.

Referring to FIGS. 1-11, a repair system 1100 for repairing the flow path surface 84 of the case 82 for a variable vane assembly 80 is disclosed in accordance with one or more aspects of the present disclosure, as shown in FIG. 11. In various embodiments, the repair system 1100 may be used to implement the method 600, however, the present disclosure is not limited to the use of the repair system 1100 for the method 600. In various embodiments, the repair system 1100 may include a control system 1102 configured to permit an operator to control operation of the repair system 1100. The control system 1102 may include any type of computing device, computational circuit, or any type of process or processing circuit capable of executing a series of instructions that are stored in memory 1104. The control system 1102 may include multiple processors and/or multi-core CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 1104 may represent one or more algorithms for controlling the aspects of the repair system 1100, and the stored instructions are not limited to any particular form (e.g., program files, system data, buffers, drivers, utilities, system programs, etc.) provided they can be executed by the control system 1102. The memory 1104 may be a non-transitory computer readable storage medium configured to store instructions that when executed by one or more processors, cause the one or more processors to perform or cause the performance of certain functions. The memory 1104 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the control system 1102 may be achieved via the use of hardware, software, firmware, or any combination thereof. The control system 1102 may also include input (e.g., a keyboard, a touch screen, etc.) and output devices (a monitor, sensor readouts, data ports, etc.) that enable the operator to input instructions, receive data, etc.

In various embodiments, the repair system 1100 may include a gauge 1106 configured to measure wear depths D2 of the plurality of wear recesses 98 as described previously herein. The gauge 1106 may be in signal communication with the control system 1102 via any wired or wireless protocol and may be controlled by the control system 1102 to measure the wear depths D2. In various embodiments, the repair system 1100 may further include a database 1108 configured to receive and store the wear depth D2 measurements from the gauge 1106. In various embodiments, the database 1108 may be located external to the control system 1102 and in signal communication with the control system 1102 via any wired or wireless protocol. In various other embodiments, the database 1108 may be integral to the control system 1102. For example, the database 1108 may be integrated with the memory 1104. The control system 1102 may access data (e.g., wear depth D2 data) stored in the database 1108.

In various embodiments, the repair system 1100 may include a milling machine 1110 in signal communication with the control system 1102 via any wired or wireless protocol. The control system 1102 may command the milling machine 1110 to machine one or more portions of the case 82. For example, the control system 1102 may command the milling machine 1110 to machine the lip 108 a respective wear recess 98 in the flow path surface 84 of the case 82. The control system 1102 may also command the milling machine 1110 to machine the repaired wear recesses 98, for example, as part of Step 616 described previously herein.

In various embodiments, the repair system 1100 may include a coating spray torch 1112 configured to apply the coating 114 to the wear recesses 98. The coating spray torch 1112 may be in signal communication with the control system 1102 via any wired or wireless protocol for control of the spray torch 1112 by the control system 1102. In various embodiments, the repair system 1100 may further include a rotatable fixture 1114 configured to hold the case 82 and to rotate the case 82 relative to the coating spray torch 1112. Accordingly, the rotatable fixture 1114 may rotate the case 82 to align a wear recess 98 with the coating spray torch 1112 for application of the coating 114 to the wear recess 98.

In various embodiments, the database 1108 may store a position of each wear recess 98 of the plurality of wear recesses 98 relative to a position of the rotatable fixture 1114. The control system 1102 may command the rotatable fixture 1114 to a first position in which the coating spray torch 1112 is aligned with a particular wear recess 98 of the plurality of wear recesses 98. In various embodiments, the control system 1102 may determine a total thickness of the coating 114 to be deposited in a wear recess 98 at the first position based on the stored wear depth D2 (e.g., stored in the database 1108) for the wear recess 98 at the first position. In various embodiments, the stored wear depth D2 may be a measured depth (e.g., from gauge 1106) or a wear depth D2 manually entered into the database 1108. The control system 1102 may then command the coating spray torch 1112 to deposit a first layer in a first wear recess 98. After applying the first layer to the first wear recess 98, the control system 1102 may then command the rotatable fixture 1114 to rotate to align the coating spray torch 1112 to a second wear recess 98 (e.g., a circumferentially adjacent wear recess 98) of the plurality of wear recesses 98. The control system 1102 may then repeat the steps of determining the total thickness of the coating 114 to be deposited, depositing the coating 114, and rotating the case 82 for each wear recess 98 of the plurality of wear recesses 98 until each wear recess 98 has been sufficiently coated, as previously described herein. By depositing the coating 114 in a series of layers to each wear recess 98, as opposed to all at once, the coating 114 may form a stronger bond with the case 82.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A method for repairing a flow path surface of a case for a variable vane assembly, the method comprising:
    measuring a wear depth at a location within a wear recess formed in the flow path surface of the case, wherein the case comprises a plurality of stator pockets formed in the flow path surface and wherein the wear recess extends about a circumferential portion of a first stator pocket of the plurality of stator pockets between a first circumferential side and a second circumferential side with respect to a centerline axis of the first stator pocket, the wear recess further extending through a sidewall of the first stator pocket;
    determining a coating thickness corresponding to the wear depth at the location; and
    repairing the flow path surface of the case by applying a coating to the wear recess, the coating having the coating thickness at the location.

2. The method of claim 1, wherein the flow path surface defines at least one lip of the wear recess along at least the first circumferential side.

3. The method of claim 2, further comprising machining the flow path surface to remove the at least one lip prior to applying the coating to the wear recess.

4. The method of claim 1, wherein applying the coating to the wear recess comprises depositing the coating in the wear recess using a double-wire feed and plasma arc additive manufacturing process.

5. The method of claim 4, wherein applying the coating to the wear recess includes applying a plurality of coating layers.

6. The method of claim 4, wherein the coating is a nickel-aluminum plasma coating.

7. The method of claim 1, wherein:
    measuring the wear depth includes measuring a plurality of wear depths at a plurality of respective locations within the wear recess;
    determining the coating thicknesses includes determining a plurality of coating thicknesses corresponding to the plurality of wear depths at the plurality of respective locations; and
    the coating has the plurality of coating thicknesses at the plurality of respective locations.

8. A method for repairing a flow path surface of a case for a variable vane assembly, the method comprising:
    machining the flow path surface of the case to remove a lip of a wear recess formed in the flow path surface, the case including a first axial side and a second axial side opposite the first axial side, wherein the case comprises a plurality of stator pockets formed in the flow path surface, wherein the wear recess is located proximate a first stator pocket of the plurality of stator pockets and is formed in the flow path surface outside of the first stator pocket, wherein the wear recess extends between a first circumferential side and a second circumferential side relative to a centerline axis of the first stator pocket, and wherein the flow path surface defines the lip of the wear recess along the first circumferential side of the wear recess and the first side of the wear recess is positioned axially between the first axial side of the case and the second circumferential side of the wear recess;
    repairing the flow path surface of the case by directing a coating spray torch toward the wear recess in a tool insertion direction extending from the first axial side of the case toward the first circumferential side of the wear recess and applying a coating to the wear recess with the coating spray torch, the coating having a thickness which is equal to or greater than a wear depth of the wear recess; and
    machining the coating in the wear recess to restore the flow path surface to a predetermined dimensional specification.

9. The method of claim 8, further comprising rotating the case to align the coating spray torch with the wear recess prior to applying the coating to the wear recess.

10. The method of claim 8, wherein applying the coating to the wear recess includes applying a plurality of coating layers.

* * * * *